De Witt C. Thomas,

Potato Digger.

No. 91,182.  Patented June 8, 1869.

Witnesses.
Job Tiffany
Daniel Ketchum

Inventor.
De Witt C. Thomas

United States Patent Office.

DE WITT C. THOMAS, OF EASTON, NEW YORK.

Letters Patent No. 91,182, dated June 8, 1869.

IMPROVEMENT IN POTATO-DIGGERS.

The Schedule referred to in these Letters Patent and making part of the same.

*To all whom it may concern:*

Be it known that I, DE WITT C. THOMAS, of the town of Easton, Washington county, and State of New York, have invented a new and useful Improvement in Potato-Diggers; and I hereby declare the following to be a full and exact description thereof, reference being had to the accompanying drawings, and to the letters of reference marked thereon, making a part of this specification.

My improvement has for its object the construction and attachment of a suitable device to separate the potatoes from the earth, by first lifting them from their bed in the earth, and throwing them upon a separator, by means of which the potatoes are gathered in the separator, and emptied upon the surface of the ground, in the rear of the digger.

In the accompanying drawings—

Figure 1:
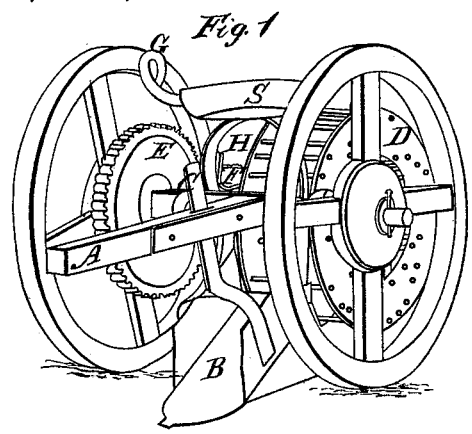
Figure 1 represents a front lateral view of a potato-digger with my improvement attached.
Figure 2:
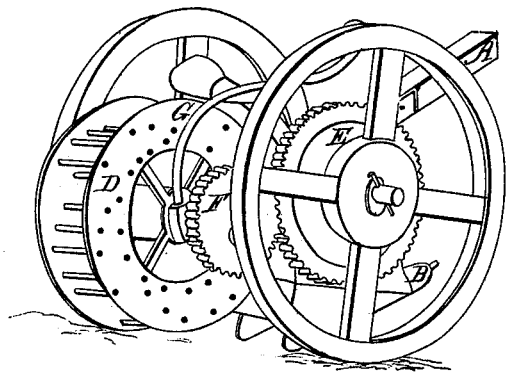
Figure 2 represents a rear lateral view of the same, showing the separator D in position, connected with said potato-digger.
Figure 3:
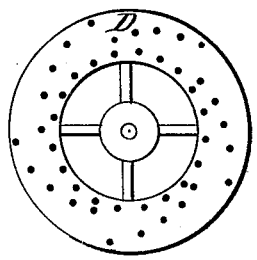
Figure 3 represents an end view of the separator detached from the digger.

The operation of a potato-digger with my improvement attached is as follows:

In fig. 1, the neap of the digger, by which the same is drawn forward by horse-power or other power, is seen at A.

The shovel that passes beneath the potatoes in the hill, and raises them to the separator, is seen at B, and attached to the neap by means of the support C, as represented in fig. 1.

The separator is a wheel, constructed with sides, circular in form, and wire rods, so arranged as to constitute buckets, similar to those of a water-wheel in form, though not in character.

The object of these buckets is to receive the potatoes and the earth, &c., as they are taken from the hill or row at the rear end of the shovel, and by revolving backward, by means of the gear-wheel E and pinion F, to sift out the earth and empty the potatoes, freed from earth, at the rear end of the machine, where the buckets would naturally empty themselves, being, at such point, in an inverted position.

In the construction of this circular separator, the buckets are made of small metallic rods, arranged as represented in the drawings, for the purpose of retaining the potatoes in the separator, while the earth, falling between the rods, would be separated from the potatoes, and the potatoes being retained until the bucket should become inverted in the rear, they would be emptied upon the surface of the ground behind the machine.

The pinion F is made to slide upon the shaft of the separator, by means of the bent lever H, for the purpose of throwing the separator out of connection with the driving-part of the machine, by withdrawing the pinion F from the gear-wheel E, so that the digger may be driven forward without operating the separator.

The separator may be raised above the ground or the hill, when desired, by depressing the lever G.

The shovel B can be raised out of or above the earth by means of a lever attached to the connecting-support C.

In fig. 1, S represents the seat upon which the driver rides while operating the digger.

In the construction of the separator, the wires constituting the buckets may be made to pass vertically around the wheel, instead of horizontally, as in the annexed drawing. So, also, the buckets may be constructed of wood or boards, when the velocity of the separator is such as to project the potatoes beyond the loose earth, by means of their different velocities, as they are thrown to the earth.

Having thus fully described my said improvement, I will proceed to state my claim.

I claim the separator D, in combination with a shovel, and the operating-parts of a potato-digger, constructed substantially in the manner and for the purposes above described.

DE WITT C. THOMAS.

Witnesses:
 JOEL TIFFANY,
 DANIEL KETCHUM.